(12) United States Patent
Chi et al.

(10) Patent No.: US 8,832,098 B2
(45) Date of Patent: Sep. 9, 2014

(54) RESEARCH TOOL ACCESS BASED ON RESEARCH SESSION DETECTION

(75) Inventors: Liang-Yu Chi, San Francisco, CA (US); Jon C. Maddox, Richmond, VA (US); Ashley Hall, Menlo Park, CA (US)

(73) Assignee: Yahoo! Inc., Sunnyvale, CA (US)

(*) Notice: Subject to any disclaimer, the term of this patent is extended or adjusted under 35 U.S.C. 154(b) by 382 days.

(21) Appl. No.: 12/181,912

(22) Filed: Jul. 29, 2008

(65) Prior Publication Data
US 2010/0030736 A1      Feb. 4, 2010

(51) Int. Cl.
*G06F 7/00* (2006.01)
*G06F 17/30* (2006.01)

(52) U.S. Cl.
CPC ................. *G06F 17/30864* (2013.01)
USPC .......................... 707/731; 707/738

(58) Field of Classification Search
CPC ................................. G06F 17/30864
USPC .................................. 707/731, 738
See application file for complete search history.

(56) References Cited

U.S. PATENT DOCUMENTS

| | | | |
|---|---|---|---|
| 5,241,671 A * | 8/1993 | Reed et al. ............ | 1/1 |
| 5,905,493 A * | 5/1999 | Belzer et al. ........... | 715/835 |
| 6,473,752 B1 | 10/2002 | Fleming et al. | |
| 6,546,399 B1 * | 4/2003 | Reed et al. ............ | 1/1 |
| 6,941,317 B1 | 9/2005 | Chamberlin et al. | |
| 7,146,416 B1 | 12/2006 | Yoo et al. | |
| 2002/0010625 A1 * | 1/2002 | Smith et al. ............ | 705/14 |
| 2002/0091836 A1 | 7/2002 | Moetteli | |
| 2002/0147724 A1 * | 10/2002 | Fries et al. ............ | 707/100 |
| 2003/0014399 A1 | 1/2003 | Hansen et al. | |
| 2003/0212673 A1 * | 11/2003 | Kadayam et al. ....... | 707/3 |
| 2004/0249787 A1 | 12/2004 | Chundi et al. | |
| 2005/0246320 A1 | 11/2005 | Benysh et al. | |
| 2006/0064341 A1 | 3/2006 | Frengut et al. | |
| 2007/0174338 A1 * | 7/2007 | Liggett ................. | 707/104.1 |

(Continued)

FOREIGN PATENT DOCUMENTS

| CN | 1390332 | 1/2003 |
|---|---|---|
| CN | 1535433 A | 10/2004 |

(Continued)

OTHER PUBLICATIONS

Agarwal, "View or Search Your Web Browser History in a Picture Timeline", retrieved from <http://labnol.blogspot.com/2007/06/view-your-web-browser-history-in-visual.html> on Aug. 9, 2011, (Jun. 13, 2007), 4 pages.

(Continued)

*Primary Examiner* — Cheyne D Ly
(74) *Attorney, Agent, or Firm* — Pillsbury Winthrop Shaw Pittman LLP

(57) ABSTRACT

A system and method is described herein that automatically detects when a user of a search engine is conducting a research session about a particular topic and then presents the user with access to one or more research-related tools responsive to detecting that the research session is being conducted. The research-related tool(s) may include one or more tools used for collecting, organizing and sharing content about the particular topic. The automatic provision of access to the research-related tool(s) responsive to detection of the research session can advantageously improve the experience of the user conducting the research session.

30 Claims, 13 Drawing Sheets

(56) References Cited

U.S. PATENT DOCUMENTS

| | | | |
|---|---|---|---|
| 2007/0266002 A1* | 11/2007 | Chowdhury et al. | 707/2 |
| 2008/0114756 A1 | 5/2008 | Konig et al. | |
| 2008/0319944 A1* | 12/2008 | Venolia et al. | 707/3 |
| 2010/0003190 A1 | 1/2010 | Kolyada et al. | |
| 2010/0017383 A1* | 1/2010 | Gaucas | 707/5 |

FOREIGN PATENT DOCUMENTS

| | | |
|---|---|---|
| CN | 1867908 A | 11/2006 |
| JP | 6-282591 A | 10/1994 |
| JP | 2006-285982 A | 10/2006 |
| WO | 2010014525 A2 | 2/2010 |
| WO | 2010014525 A3 | 4/2010 |

OTHER PUBLICATIONS

Lennartz, "Should Links Open in New Windows?", retrieved from <http://uxdesign.smashingmagazine.com/2008/07/01/should-links-open-in-new-windows/> on Aug. 9, 2011, (Jul. 1, 2008), 8 pages.

Extended European Search Report received for European Patent Application No. 09803424.2, mailed on Nov. 3, 2011, 7 pages.

Office Action Received for Chinese Patent Application No. 200980128726.0, mailed on Oct. 29, 2012, 2012, 8 pages of Chinese Office action and 12 Pages of English translation.

Office Action Received for Japanese Patent Application No. 2011521214, mailed on Dec. 20, 2012, 3 pages of Chinese Office action and 3 Pages of English translation.

Chinese Office Action dated Jul. 30, 3013 corresponding to Chinese Serial No. 200980128726.0.

* cited by examiner

300

400

RESEARCH TOOL ACCESS BASED ON RESEARCH SESSION DETECTION

BACKGROUND OF THE INVENTION

1. Field of the Invention

The present invention generally relates to research tools for collecting and organizing content accessed via an information retrieval system, such as content accessed via the World Wide Web. More specifically, the present invention is related to techniques for automatically providing access to such research tools.

2. Background

The increase in available content on the World Wide Web and innovations in Internet search technology have changed the way people access information. By searching the Web, a user can now perform a wide variety of research-based tasks such as planning a vacation, purchasing a car, or performing academic research. While finding sought-after information on the Web has generally become easier, collecting and organizing Web research and coming back to it remains challenging. This is due, in part, to the fact that Web-based research sessions may contain many queries, span multiple sessions, involve gathering large amounts of content, and change in focus over time as new topics of research emerge.

Current methods for collecting and organizing Web content include saving bookmarks or tabs, collecting Web content into documents, or storing pages locally. Various tools have also been developed that permit a user to selectively save and organize Web content in a notebook form. Such tools are typically designed to run alongside or in an integrated fashion with a Web browser. While useful, each of these methods and tools require a user to proactively recognize that a research session about a particular topic is commencing and then, based on this recognition, to take active steps to initiate the selected method or tool for collecting and organizing Web content.

BRIEF SUMMARY OF THE INVENTION

A system and method is described herein that automatically detects when a user of a search engine is conducting a research session about a particular topic and then presents the user with access to one or more research-related tools responsive to detecting that the research session is being conducted. The research-related tool(s) may include one or more tools used for collecting, organizing and sharing content about the particular topic. The automatic provision of access to the research-related tool(s) responsive to detection of the research session can advantageously improve the experience of the user conducting the research session.

In particular, a method for automatically providing access to one or more research tools is described herein. In accordance with the method, information related to a series of queries submitted by a user of a search engine is obtained. Based on the obtained information, a determination is made as to whether the user of the search engine is conducting a research session about a particular topic. Responsive to determining that the user of the search engine is conducting a research session about a particular topic, access to the one or more research tools is provided to the user of the search engine.

A system is also described herein. The system includes a search engine and a research session manager connected to the search engine. The search engine is configured to receive a series of queries submitted by a user and to identify one or more documents responsive to each query in the series of queries. The research session manager is configured to obtain information related to the series of queries, to determine if the user of the search engine is conducting a research session about a particular topic based on the obtained information, and to provide access to the user of the search engine to one or more research tools based on this determination.

A computer program product is also described herein. The computer program product includes a computer-readable medium having computer program logic recorded thereon for enabling a processor to automatically providing access to one or more research tools. The computer program logic includes first means, second means and third means. The first means are for enabling the processor to obtain information related to a series of queries submitted by a user of a search engine. The second means are for enabling the processor to determine if the user of the search engine is conducting a research session about a particular topic unit based on the obtained information. The third means are for enabling the processor to provide access to the user of the search engine to the one or more research tools responsive to determining that the user of the search engine is conducting a research session about a particular topic.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
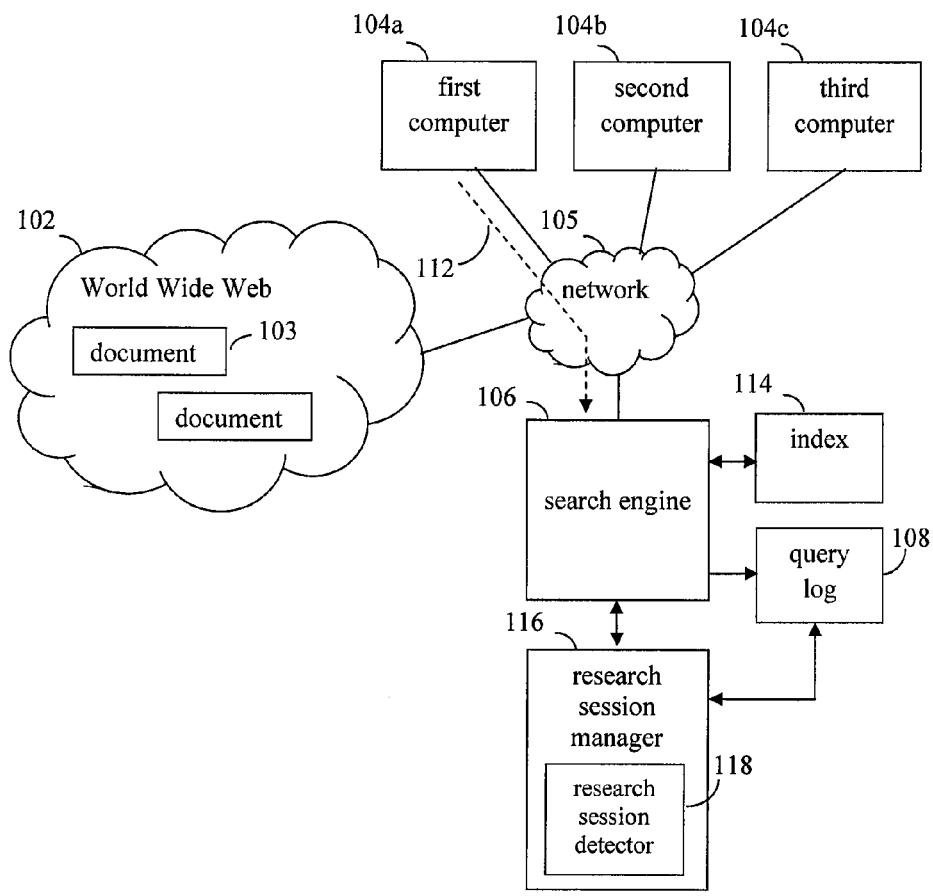
FIG. 1 is a block diagram of an information retrieval system in which an embodiment of the present invention may be implemented.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

A. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

A system and method in accordance with an embodiment of the present invention automatically detects when a user of a search engine is conducting a research session about a particular topic and then presents the user with access to one or more research-related tools responsive to detecting that the research session is being conducted. The research-related tool(s) may include one or more tools used for collecting, organizing and sharing content about a particular topic. The automatic provision of access to the research-related tool(s) responsive to detection of the research session can advantageously improve the experience of the user conducting the research session.

FIG. 1 is a block diagram of an information retrieval system 100 in which an embodiment of the present invention may be implemented. System 100 is described herein for illustrative purposes only, and it is noted that embodiments of the present invention may be implemented in alternative environments. As shown in FIG. 1, system 100 includes a search engine 106. One or more computers 104, such as first computer 104a, second computer 104b and third computer 104c, are connected to a communication network 105. Network 105 may be any type of communication network, such as a local area network (LAN), a wide area network (WAN), or a combination of communication networks. In embodiments, network 105 may include the Internet and/or an intranet. Computers 104 can retrieve documents from entities over network 105. In embodiments where network 105 includes the Internet, a collection of documents, including a document 103, which form a portion of World Wide Web 102, are available for retrieval by computers 104 through network 105. On the Internet, documents may be identified/located by a uniform resource locator (URL), such as http://www.yahoo.com, and/or by other mechanisms. Computers 104 can access document 103 through network 105 by supplying a URL corresponding to document 103 to a document server (not shown in FIG. 1).

As shown in FIG. 1, search engine 106 is coupled to network 105. Search engine 106 accesses a stored index 114 that indexes documents, such as documents of World Wide Web 102. A user of computer 104a who desires to retrieve one or more documents relevant to a particular topic, but does not know the identifier/location of such a document, may submit a query 112 to search engine 106 through network 105. Search engine 106 receives query 112, and analyzes index 114 to find documents relevant to query 112. For example, search engine 106 may identify a set of documents indexed by index 114 that include terms of query 112. The set of documents may include any number of documents, including tens, hundreds, thousands, millions, or even billions of documents. Search engine 106 may use a ranking or relevance function to rank documents of the retrieved set of documents in an order of relevance to the user. Documents of the set determined to most likely be relevant may be provided at the top of a list of the returned documents in an attempt to avoid the user having to parse through the entire set of documents. The list of the returned documents may be provided in the context of a document termed a "search results page."

Search engine 106 may be implemented in hardware, software, firmware, or any combination thereof. For example, search engine 106 may include software/firmware that executes in one or more processors of one or more computer systems, such as one or more servers. Examples of search engine 106 that are accessible through network 105 include, but are not limited to, Yahoo! Search™ (at http://www.yahoo.com), Ask.com™ (at http://www.ask.com), and Google™ (at http://www.google.com).

Figure 2:
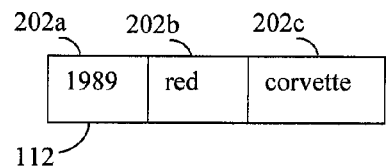
FIG. 2 shows an example query that may be submitted by a user to a search engine.

FIG. 2 shows an example query 112 that may be submitted by a user of one of computers 104a-104c of FIG. 1 to search engine 106. As shown in FIG. 2, query 112 includes one or more terms 202, such as first term 202a, second term 202b and third term 202c. Any number of terms 202 may be present in a query. As shown in FIG. 2, terms 202a, 202b and 202c of query 112 are "1989," "red," and "corvette," respectively. Search engine 106 applies these terms 202a-202c to index 114 to retrieve a document locator, such as a URL, for one or more indexed documents that match "1989," "red," and "corvette," and may order the list of documents according to a ranking.

As also shown in FIG. 1, search engine 106 may generate a query log 108. Query log 108 is a record of searches that are made using search engine 106. Query log 108 may include a list of queries, by listing query terms (e.g., terms 202 of query 112) along with further information/attributes for each query, such as a list of documents resulting from the query, a list/indication of documents in the list that were selected/clicked on ("clicked") by a user reviewing the list, a ranking of clicked documents, a timestamp indicating when the query is received by search engine 106, an IP (internet protocol) address identifying a unique device (e.g., a computer, cell phone, etc.) from which the query terms were submitted, an identifier associated with a user who submits the query terms (e.g., a user identifier in a web browser cookie), and/or further information/attributes.

As further shown in FIG. 1, system 100 also includes a research session manager 116 connected to search engine 106 and query log 108. Research session manager 116 is configured to automatically provide users of computers 104a-104c with access to one or more research tools by which documents retrieved using search engine 106 (and content included therein) can be easily collected and organized into a single research document. In an embodiment, access to the research tool(s) is provided to a user via a search results page generated by search engine 106.

In an embodiment, research session manager 116 is configured to provide access to the research tool(s) responsive to determining that a user is using search engine 106 to conduct a research session about a particular topic. To this end, research session manager 116 includes a research session detector 118 configured to automatically make such a determination. Research session detector 118 may access query log 108 and/or other information sources in order to make the determination as will be described in more detail herein. The manner in which research session detector 118 automatically determines whether a user is conducting a research session using search engine 106 and the manner in which research session manager 116 provides access to the research tool(s) responsive to such a determination will be described in more detail below.

By automatically providing access to one or more research-related tools responsive to automatic detection of a research session, research session manager 116 can advantageously improve the experience of the user conducting the research session. For example, such a feature ensures that access to the research-related tool(s) is provided at an appropriate time and within a convenient context for the user. This approach also represents an improvement over one in which the user must proactively recognize that a research session about a particular topic is commencing and then, based on this recognition, take active steps to initiate the research tool(s). This latter approach requires extra planning and effort by the user. The approach implemented by research session manager 116 may also be deemed preferable to one in which access to the research tool(s) is provided to the user at all times, since this may actually condition the user to ignore the research tool(s), particularly when such tool(s) are not useful in a majority of search sessions carried out by the user.

Like search engine 106, research session manager 116 may be implemented in hardware, software, firmware, or any combination thereof. For example, research session manager 116 may include software/firmware that executes in one or more processors of one or more computer systems, such as one or more servers.

Figure 3:
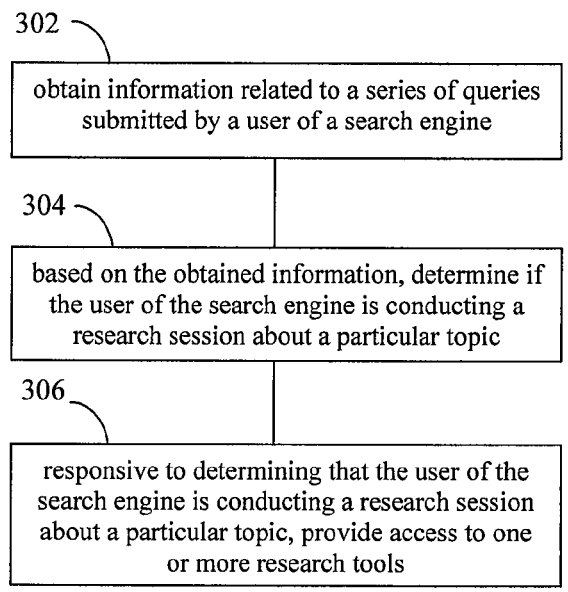
FIG. 3 depicts a flowchart of a method for automatically providing access to one or more research tools in accordance with an embodiment of the present invention.

B. Research Session Detection and Provision of Access to Research Tools Responsive to Same FIG. 3 depicts a flowchart 300 of a method for automatically providing access to one or more research tools responsive to detecting that a user of a search engine is conducting a research session about a particular topic in accordance with an embodiment of the present invention. The method of flowchart 300 will be described in reference to elements of system 100. However, it is noted that the method is not limited to that implementation.

As shown in FIG. 3, the method of flowchart 300 begins at step 302 in which research session detector 118 obtains information related to a series of queries submitted by a user of search engine 106. The user may be, for example, any of the users of computers 104a-104c and the queries may be submitted from any one of computers 104a-104c to search engine 106 via network 105 in a manner previously described.

The information related to the queries may comprise the queries themselves as well as information relating to the documents identified by search engine 106 in response to receiving the queries. Information relating to a document identified by search engine 106 may include, for example, a title of the document, a URL associated with the document, text of the document, an abstract or summary of the document generated by search engine 106, a tag or tags associated with the document, or various metadata associated with the document.

The information related to the series of queries may also comprise the total number of queries in the series. The number of queries in a series may be considered indicative of the length of a particular information retrieval session. The information related to the series of queries may further include a number of documents retrieved responsive to each query that have been subsequently accessed by a user via a search results page provided by search engine 106.

Depending upon the implementation, all or part of the information related to the series of queries may be obtained from query log 108 and/or directly from search engine 106. Additionally, all or part of the information related to the series of queries may be obtained from a browse history log (not shown in FIG. 1) which may be maintained by the same entity that maintains search engine 106. The browse history log maintains a list of documents previously accessed by a user, regardless of whether or not the user accessed the document via an interface, such as a search results page, provided by search engine 106. The maintenance of browse history information for a particular user requires that certain browser software be installed on the computer being used for accessing documents. Furthermore, all or part of the information related to the series of queries may be obtained from one or more network-level server logs that may be maintained by the same entity that maintains search engine 106. Still further, all or part of the information related to the series of queries may be stored locally on one of computers 104a-104c and then communicated via network 105 as part of an interaction between the computer and search engine 106.

Figure 4:
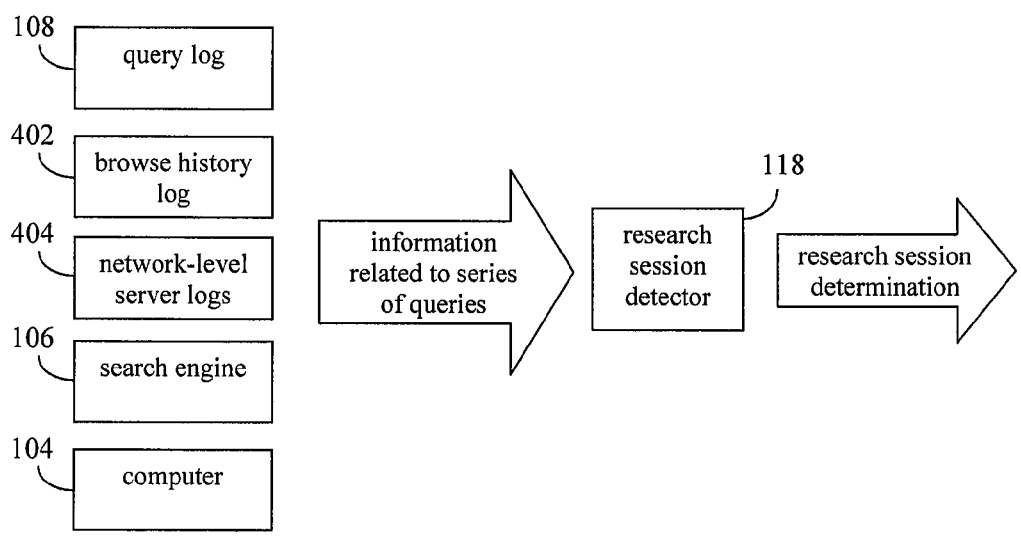
FIG. 4 is a block diagram that depicts a system for detecting when a user of a search engine is conducting a research session about a particular topic in accordance with an embodiment of the present invention.

FIG. 4 is a block diagram 400 that depicts research session detector 118 and the various sources from which it may obtain information related to the series of queries submitted by the user of search engine 106 in accordance with various embodiments of the present invention. As shown in FIG. 4, research session detector 118 may obtain information related to the series of queries from query log 108, a browse history log 402, one or more network-level server logs 404, from search engine 106, or from a user computer 104. Block diagram 400 is not intended to indicate that research session detector 118 must obtain the information related to the series of queries from all those sources but rather that research session detector 118 may obtain the information related to the series of queries from one or more of those sources depending upon the implementation.

Returning now to flowchart 300, after the information related to the series of queries submitted by the user is obtained by research session detector 118 at step 302, research session detector 118 determines if the user of search engine 106 is conducting a research session about a particular topic based on the obtained information as shown at step 304. The manner in which research session detector 118 determines if the user of search engine 106 is conducting a research session about a particular topic will be described in more detail below. With continued reference to block diagram 400 of FIG. 4, the output of this step is denoted "research session determination."

At step 306, responsive to a determination from research session detector 118 that the user of search engine 106 is conducting a research session about a particular topic, research session manager 116 provides access to one or more research tools to the user. Access to the research tool(s) may be provided for example, via the insertion or overlaying of certain prompts or user interface elements into or on top of a search results page or other interface provided by search engine 106 to a computer 104 associated with the user. Various means by which access to the research tool(s) may be provided in accordance with embodiments of the present invention will be described in a subsequent section.

1. Research Session Detection Factors

Various factors may be considered by research session detector 118 to determine whether or not a user of search engine 106 is conducting a research session about a particular topic. Each such factor may used to discern whether the user has a research intent based on an aspect or result of the interaction of the user with search engine 106. Some of these factors will be described below. Each of these factors may be considered alone or in combination with other factors. Where a combination of factors is considered, each factor may be weighted in arriving at the ultimate determination of whether a research session is being conducted. It is noted that the following factors are described by way of example only and are not intended to limit the present invention.

Length of Information Retrieval Session.

In one embodiment, a length of the information retrieval session is considered in attempting to discern whether the user has a research intent. Generally speaking, the longer the information retrieval session, the more likely it is that the user is engaging in research. In an embodiment, the current total number of search queries submitted by a user is used as an indicator of the length of the information retrieval session.

Number of Document Accessed During Information Retrieval Session.

In one embodiment, the number of documents accessed during the information retrieval session is considered in attempting to discern a research intent on the part of the user. A document may be accessed, for example, when the user activates a link to the document on a search results page provided by search engine 106. Generally speaking, the more documents that are accessed by a user, the more likely it is that the user in engaging in a research session. The number of documents accessed may be analyzed alone, in relation to particular queries for which the documents were identified, or in relation to the total number of queries submitted by the user. For example, it may be deemed more likely that a research session is occurring where the ratio of the number of documents accessed to the number of queries submitted is high. Conversely, in a situation where a large number of queries have been submitted but very few documents have been accessed, it may be deemed more likely that the user is having difficulty forming a query rather than performing research.

Similarity Between Queries.

In one embodiment, a measure of similarity between the terms of the queries in the series of queries is considered in attempting to discern whether the user has a research intent. Where a high level of similarity is found between two or more queries, a research session may be indicated as this suggests that the user is conducting multiple searches around the same topic. A variety of techniques are known in the art for measuring the similarity between different words or strings of words. For example, such techniques may involve identifying common terms or underlying concepts among the different words or strings of words. The common terms or underlying concepts identified in this manner may further be used to help identify and describe the topic of the research session if one is detected.

Similarity Between Documents Identified Responsive to the Queries.

In one embodiment, a measure of similarity between documents identified by search engine 106 in response to different queries is considered in attempting to discern a research intent on the part of the user. Where a high level of similarity is found between documents identified in response to different queries, a research session may be indicated as this suggests that the user is conducting multiple searches around the same topic.

Comparing documents may comprise comparing text within the documents or comparing other information representative of the content of the documents such as titles of the documents, URLs associated with the documents, abstracts or summaries of the documents generated by search engine 106, tags associated with the documents, or various metadata associated with the documents. When comparing text within a number of documents, only a selected portion of the text may be compared. For example, in one embodiment, only a certain number of the most frequently occurring terms within each document are compared. Where the information to be compared comprises text, any of a wide variety of techniques known in the art for measuring the similarity between different words or strings of words may be used to provide a similarity measure. As noted above, such techniques may involve identifying common terms or underlying concepts among the different words or strings of words. The common terms or underlying concepts identified in this manner may further be used to help identify and describe the topic of the research session if one is detected.

Comparing documents may comprise comparing only a subset of the documents identified by search engine 106 in response to the different queries. For example, only a predefined number of documents identified as most relevant to each query may be compared. Alternatively, only documents accessed by the user during the information retrieval session may be used in the comparison.

Previous Research Session.

In one embodiment, an indication that the user initiated or conducted a research session about a particular topic during a prior information retrieval session is considered significant if the user is currently submitting queries or generating search results deemed related to the same topic. In this case, it may be assumed that the user is continuing the same research session and thus providing access to the research tool(s) is appropriate. The data used to indicate whether or not the user initiated or conducted a research session about a particular topic during a prior information retrieval session may be maintained by research session manager 116 or obtained from the computer 104 associated the user.

Combinations of Factors.

Depending upon the implementation, various combinations of the foregoing factors may be considered to determine whether a user is conducting a research session about a particular topic. For example, a research session may be detected if a predefined number of queries in a series of queries are determined to relate to the same topic and a certain number of documents identified by search engine 106 in response to those queries were accessed by a user. Persons skilled in the relevant art(s) will readily appreciate that other combinations and permutations of the foregoing factors may be considered in detecting a research session.

2. Variations on Research Session Detection Methodology

The method of flowchart 300 describes a scenario in which research session detector 118 analyzes information relating to a series of queries submitted by a user of search engine 106 during a single information retrieval session to determine if the user is conducting a research session. However, in alternate embodiments of the present invention, research session detector 118 may analyze information relating to queries submitted by a user of search engine 106 during multiple information retrieval sessions to determine if the user is conducting a research session. Such an approach is premised on the acknowledgment that in reality a user may perform research about a topic over a long period of time and thus the research may span multiple information retrieval sessions.

Figure 5:
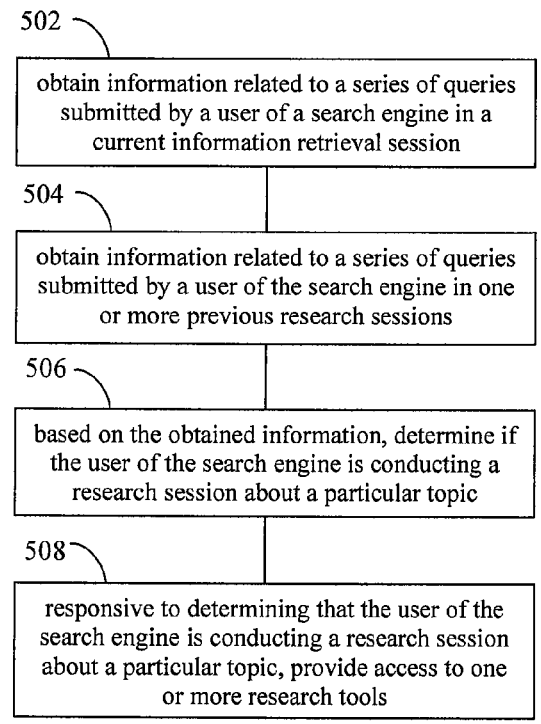
FIG. 5 depicts a flowchart of an alternate method for automatically providing access to one or more research tools in accordance with an embodiment of the present invention.

This alternate approach is depicted in flowchart 500 of FIG. 5. As shown in that figure, the method of flowchart 500 begins at step 502, in which research session detector 118 obtains information related to a series of queries submitted by a user of search engine 106 in a current information retrieval session. This step is analogous to step 302 of flowchart 300 as described above, and thus further description need not be provided. At step 504, research session detector 118 obtains information related to a series of queries submitted by the user of search engine 106 in one or more previous research sessions. The information obtained during step 504 may be of the same type and obtained from the same sources as the information obtained in step 502, except that the information obtained in step 504 relates to one or more previous information retrieval sessions conducted by the user. At step 506, research session detector 118 determines if the user of search engine 106 is conducting a research session about a particular topic based on the information obtained in both steps 502 and 504. The factors analyzed by research session detector 118 in making such a determination may include, for example any of the factors described in the previous section, except that such factors may also encompass data relating to the previous information retrieval session(s). At step 508, responsive to a determination from research session detector 118 that the user of search engine 106 is conducting a research session about a particular topic, research session manager 116 provides access to one or more research tools to the user.

The foregoing methods of flowchart 300 and flowchart 500 rely on the analysis of information related to a series of queries submitted by a user of search engine 106 to automatically detect a research session. However, in an alternate embodiment of the present invention, research session detector 118 may be configured to analyze information related to documents accessed on the World Wide Web 105 by a user regardless of whether such documents were identified by search engine 106 or accessed by the user via an interface provided by search engine 106. Such information may be obtained from a browser log, such as browse history log 402 as discussed above in reference to FIG. 4, or from some other source.

Figure 6:
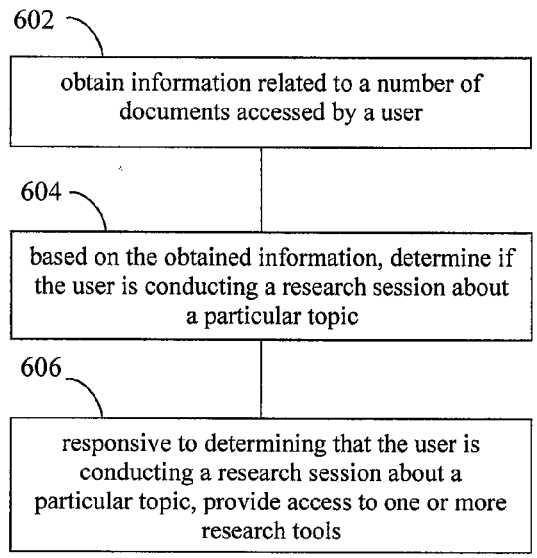
FIG. 6 depicts a flowchart of another alternate method for automatically providing access to one or more research tools in accordance with an embodiment of the present invention.

Such an approach is depicted in flowchart 600 of FIG. 6. As shown in FIG. 6, the method of flowchart 600 begins at step 602 in which research session detector 118 obtains information related to a number of documents accessed by a user. As noted above, such information may be obtained from a browse history log, such as browse history log 402 discussed above in reference to FIG. 4, or from some other source. At step 604, research session detector determines if the user is conducting a research session about a particular topic based on the information obtained in step 602. Determining if the user is conducting a research session may include analyzing the documents accessed by the user, or information related thereto, to detect a similarity between such documents or to detect a common topic from among the documents. At step 606, responsive to a determination from research session detector 118 that the user is conducting a research session about a particular topic, research session manager 116 provides access to one or more research tools.

3. Provision of Access to Research Tools

Various means by which research session manager 116 may provide a user with access to one or more research tools in accordance with embodiments of the present invention will now be described. Generally speaking, in each of the embodiments described in this section, initial access to the research tool(s) is provided to a user via the automatic insertion or overlaying of certain prompts or user interface elements within or on top of a search results page or other interface provided by search engine 106 to a computer 104. However, the invention is not limited to such embodiments, and other means for providing access to the research tool(s) may be used.

Figure 7:
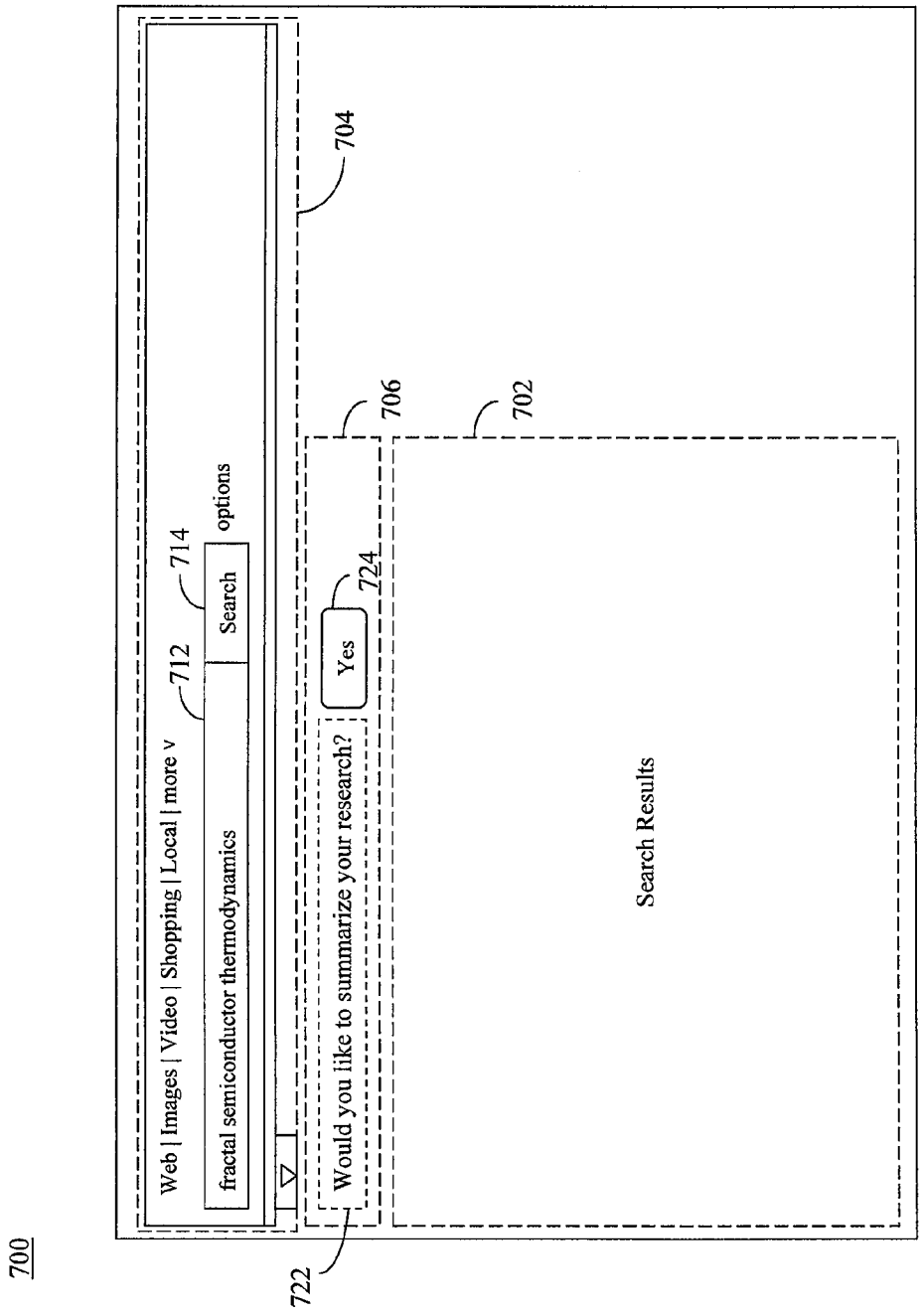
FIG. 7 is an illustration of a search results page that includes a means for accessing a research tool in accordance with an embodiment of the present invention.

FIG. 7 depicts a search results page 700 that includes a means for accessing a research tool in accordance with an embodiment of the present invention. Search results page 700 may be presented to a user by search engine 106. As shown in FIG. 7, search results page 700 includes a search results section 702 and a header section 704. Search results section 702 is used to display information about documents identified by search engine 106 in response to the submission of a search query by a user. Header section 704 includes a data entry box 712 and a search button 714. Data entry box 712 defines a user-editable area into which one or more query terms may be entered. Search button 714 comprises an interface element that, when activated by a user, causes search engine 106 to execute a document search based on the query term(s) entered in data entry box 712. In search results page 700, data entry box 712 includes the query terms "fractal semiconductor thermodynamics." These query terms are intended to represent query terms that were used by search engine 106 to identify documents described in search results section 702.

As further shown in FIG. 7, search results page 700 also includes a research tool access section 706. Research tool access section 706 may be automatically included within search results page 700 responsive to detection of a research session by research session detector 118. Research tool access section 706 comprises an invitation portion 722 and a research tool activation button 724. Invitation portion 722 includes text that asks the user whether or not the user would like to summarize his/her research. Research tool activation button 724 comprises an interface element that, when activated by a user, causes a research tool to be displayed to the user. The research tool may be displayed, for example, in a new window that is overlaid over a window in which search results page 700 is displayed. In one embodiment, the research tool is embodied in a research document that pertains to subject matter about which the user has been conducting research.

Figure 8:
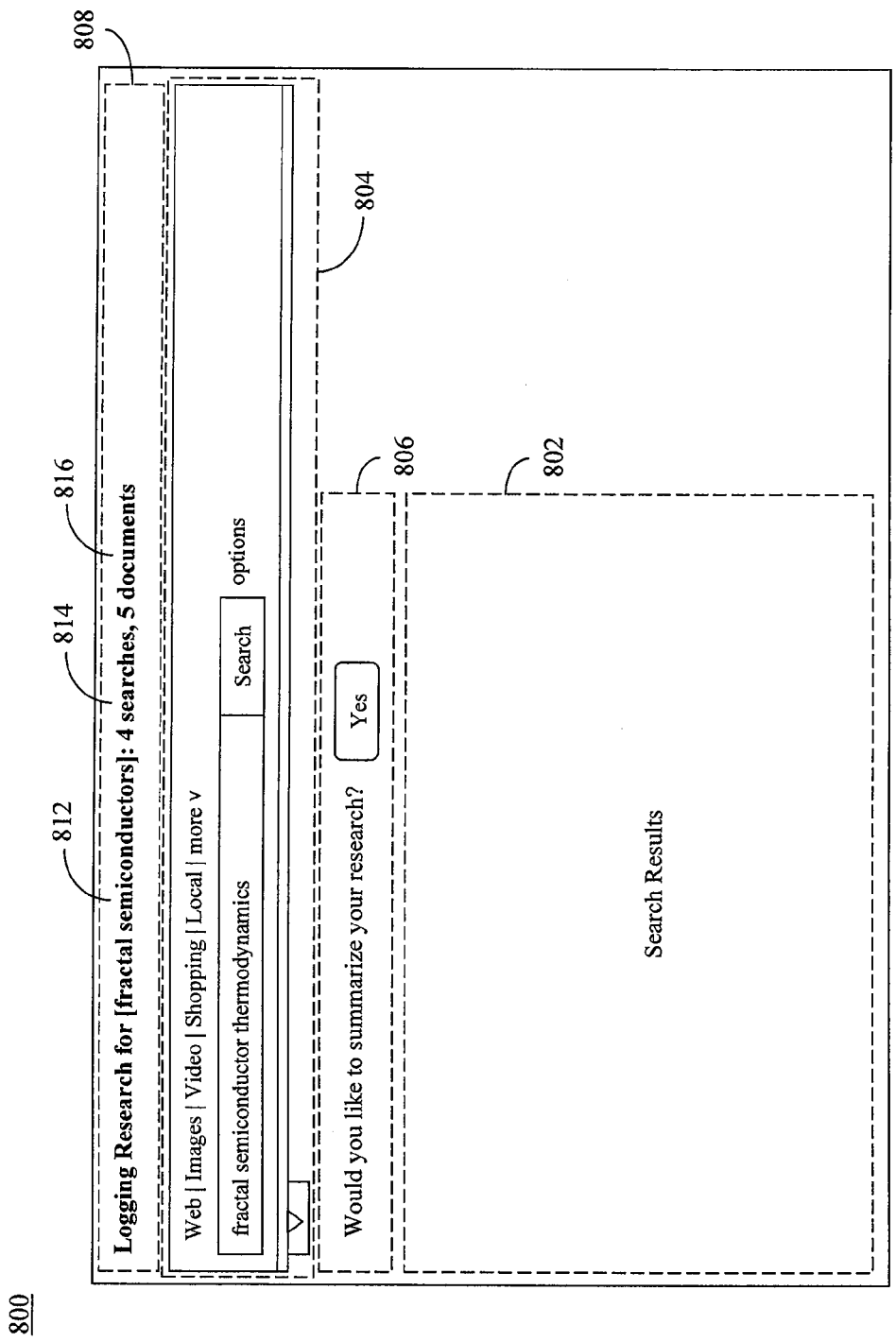
FIG. 8 is an illustration of a search results page that includes a means for accessing a research tool and a research session status section in accordance with an embodiment of the present invention.

FIG. 8 depicts an alternative search results page 800 that includes a means for accessing a research tool in accordance with an embodiment of the present invention. Search results page 800 may also be presented to a user by search engine 106. As shown in FIG. 8, search results page 800 includes a search results section 802, a header section 804, and a research tool access section 806. These sections are essentially the same as search results section 702, header section 704 and research tool access session 706, respectively, as described above with respect to search results page 700 and serve a like function.

As further shown in FIG. 8, search results page 800 also includes a research session status section 808. Like research tool access section 806, research session status section 808 may be automatically included within search results page 800 responsive to detection of a research session by research session detector 118. Research session status section 808 is intended to indicate to a user that research is being logged for the user about a particular topic. Research session status section 808 includes a description of a topic about which research is being logged 812, which as shown in FIG. 8 is "fractal semiconductors." The description of the topic may be derived, for example, from an analysis of search queries submitted by the user and/or documents identified by search engine 106 responsive to such queries. Such analysis may occur as part of the research session detection function performed by research session detector 118 as discussed above. Research session status section 808 also includes an indication of a number of searches performed by the user in relation to the particular topic 814 and an indication of the number of documents accessed by the user relating to the particular topic 816.

Figure 9:
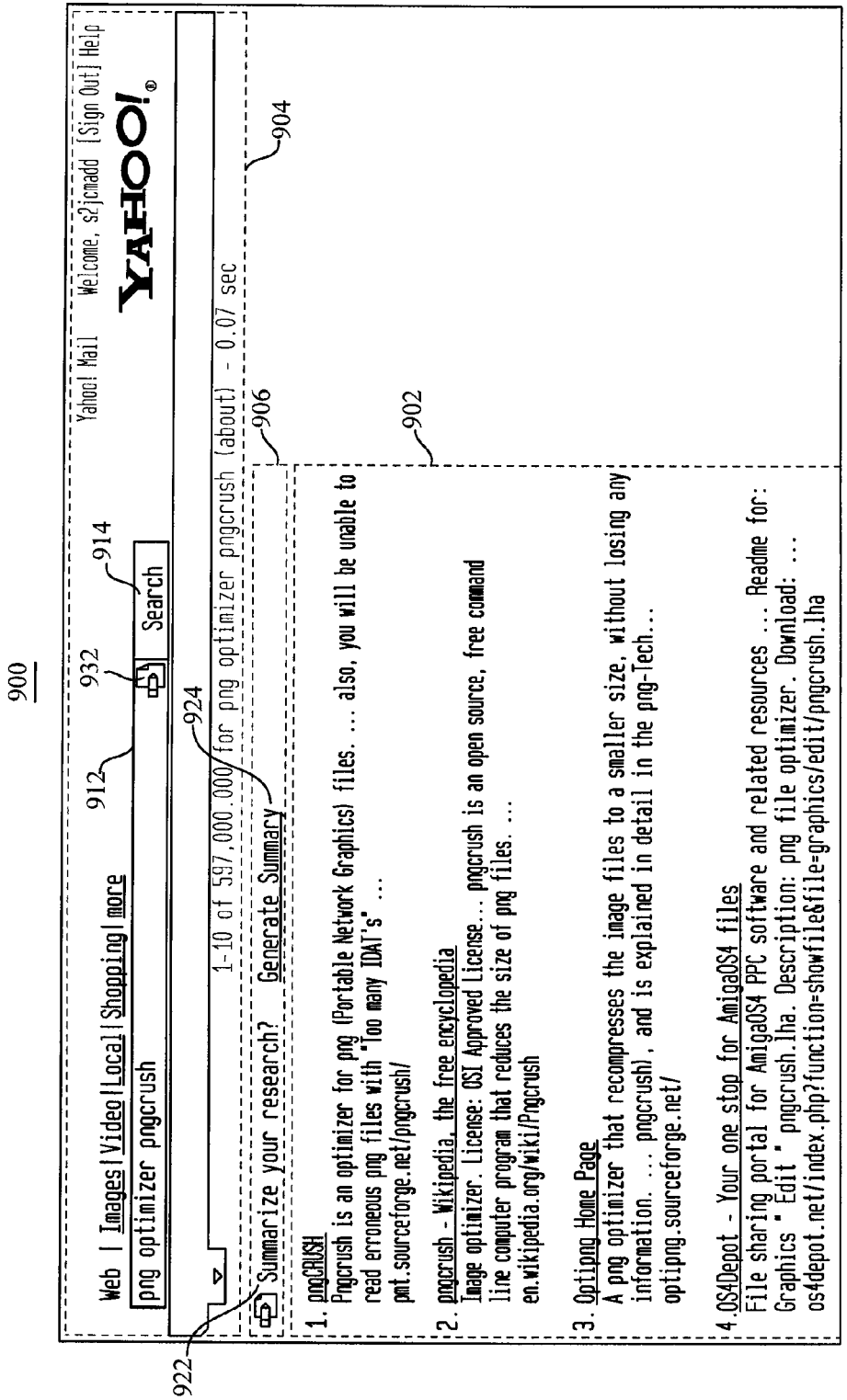
FIG. 9 is an illustration of a search results page that includes a means for accessing a research tool and a research tool activation icon in accordance with an embodiment of the present invention.

FIG. 9 depicts a further version of a search results page 900 that includes a means for accessing a research tool in accordance with an embodiment of the present invention. Like search results page 700 and 800, search results page 900 includes a search results section 902, a header section 904 and a research tool access section 906. Research tool access section 906 may be automatically included within search results page 900 responsive to detection of a research session by research session detector 118. Research tool access section 906 includes an invitation portion 922 and a research tool activation link 924. Invitation portion 922 includes text that asks the user whether or not the user would like to summarize his/her research. Research tool activation link 924 comprises an interface element that, when activated by a user, causes a research tool to be displayed to the user. The research tool may be displayed, for example, in a new window that is overlaid over a window in which search results page 900 is displayed.

As further shown in FIG. 9, header section 904 of search results page 900 includes a data entry box 912 and a search button 914. Generally speaking, these interface elements serve a similar function to data entry box 712 and search button 714 of search results page 700, respectively. However, unlike data entry box 712 of search results page 700, data entry box 912 of search results page 900 also includes a research tool activation icon 932. Research tool activation icon 932 is an interface element that, when activated by a user, provides access to a research tool in a like manner to research tool activation link 924. However, unlike research tool activation link 924, which is included in search results page 900 only when a research session has been detected by research session detector 118, research tool activation icon 932 is displayed regardless of whether or not a research session has been detected. Research tool activation icon 932 thus provides a more persistent means for a user to invoke the research tool. This may be useful in situations in which a user has not yet begun a research session but wishes to invoke the research tool anyway or a situation in which the user is engaged in a research session but research session detector 118 has failed to detect that fact. In some embodiments, activation of research tool activation icon 932 will bring up a menu of research documents that have been compiled by or on behalf of a user and the selection of one of these research documents will then cause the research tool to be displayed.

Figure 10:
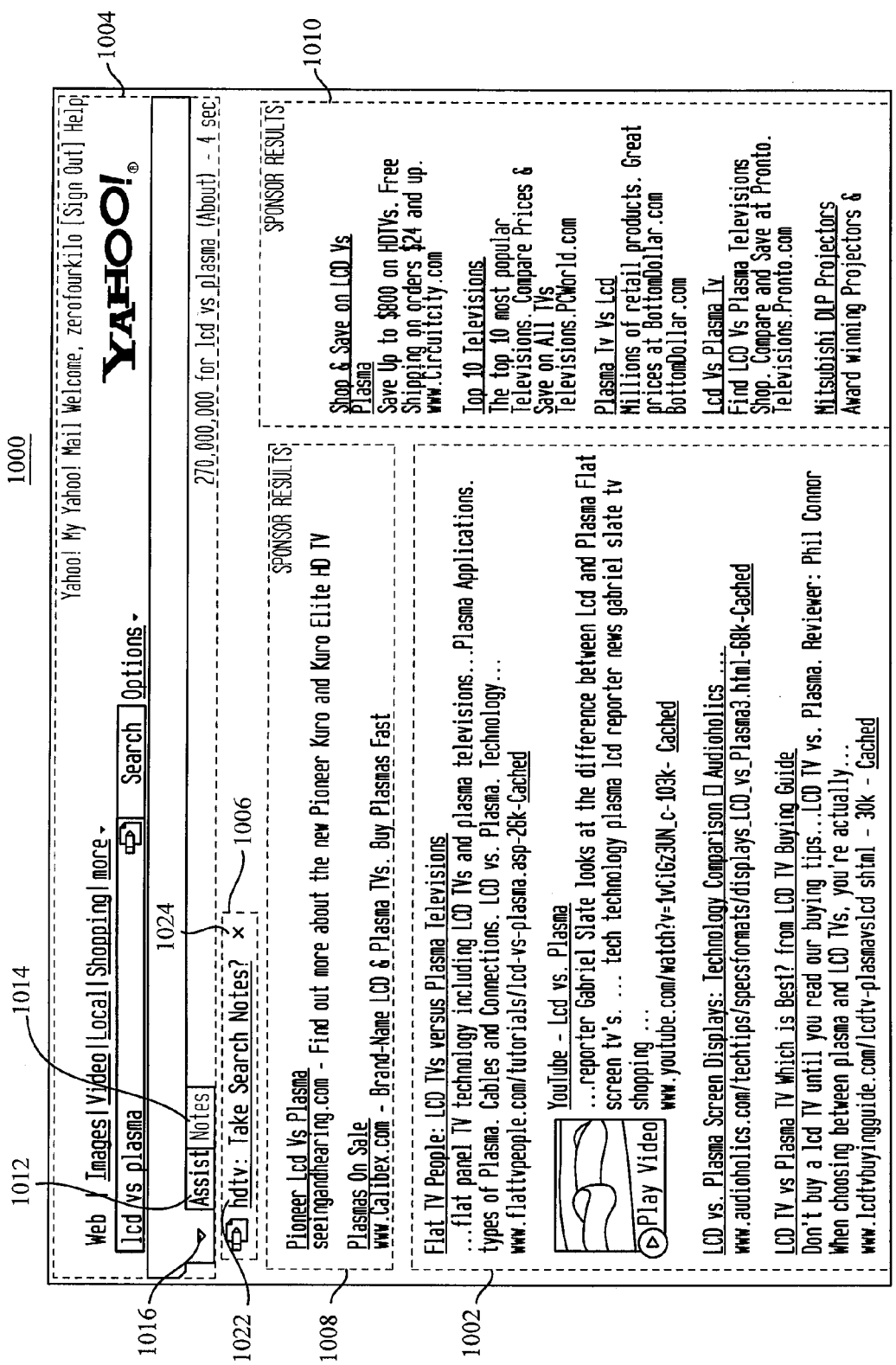
FIG. 10 is an illustration of a search results page that includes a means for accessing a research tool implemented as an on-page drop down window or panel in accordance with an embodiment of the present invention.

FIG. 10 illustrates a search results page 1000 that includes a means for accessing a research tool implemented as an on-page drop down window or panel in accordance with an embodiment of the present invention. As shown in FIG. 10, search results page 1000 includes a search results section 1002, a header section 1004, a research tool access section 1006, and two sections 1008 and 1010 dedicated to sponsored search results. Research tool access section 1006 may be automatically included within search results page 1000 responsive to detection of a research session by research session detector 118. Research tool access section 1006 includes a research tool activation link 1022. Research tool activation link 1022 is an interface element that, when activated by a user, causes a research tool to be displayed to the user. Research tool activation link 1022 advantageously comprises text that describes the topic of the research session that has been detected as well as text that asks the user whether or not the user would like to take notes about his/her research. As shown in FIG. 10, the topic of the research session as detected by research session detector 118 is "hdtv." Research tool access section 1006 also includes a cancellation element 1024 (denoted with an "X") that allows a user to decline the invitation to access the research tool. When activated by a user, cancellation element 1024 causes research tool access section 1006 to be removed from search results page 1000 and causes any logged research session results to be discarded.

If a user activates research tool activation link 1022, then a research tool is displayed to the user in an on-page drop down window within search results page 1000. The on-page drop down window extends from beneath header section 1004. In particular, as shown in FIG. 10, two on-page drop down windows are accessible from a tab at the bottom of header section 1004—a first tab portion 1012, denoted "Assist," facilitates access to an assistance tool that is intended to help a user in formulating a search query and locating desired information while a second tab portion 1014, denoted "Notes," facilitates access to the research tool. Accessing either of these tools involves selecting the appropriate tab portion and then activating an expansion element 1016. The use of an on-page drop down window or panel to display the research tool as opposed to a separate window may improve the user experience by avoiding or at least mitigating window management issues while performing research.

Figure 11:
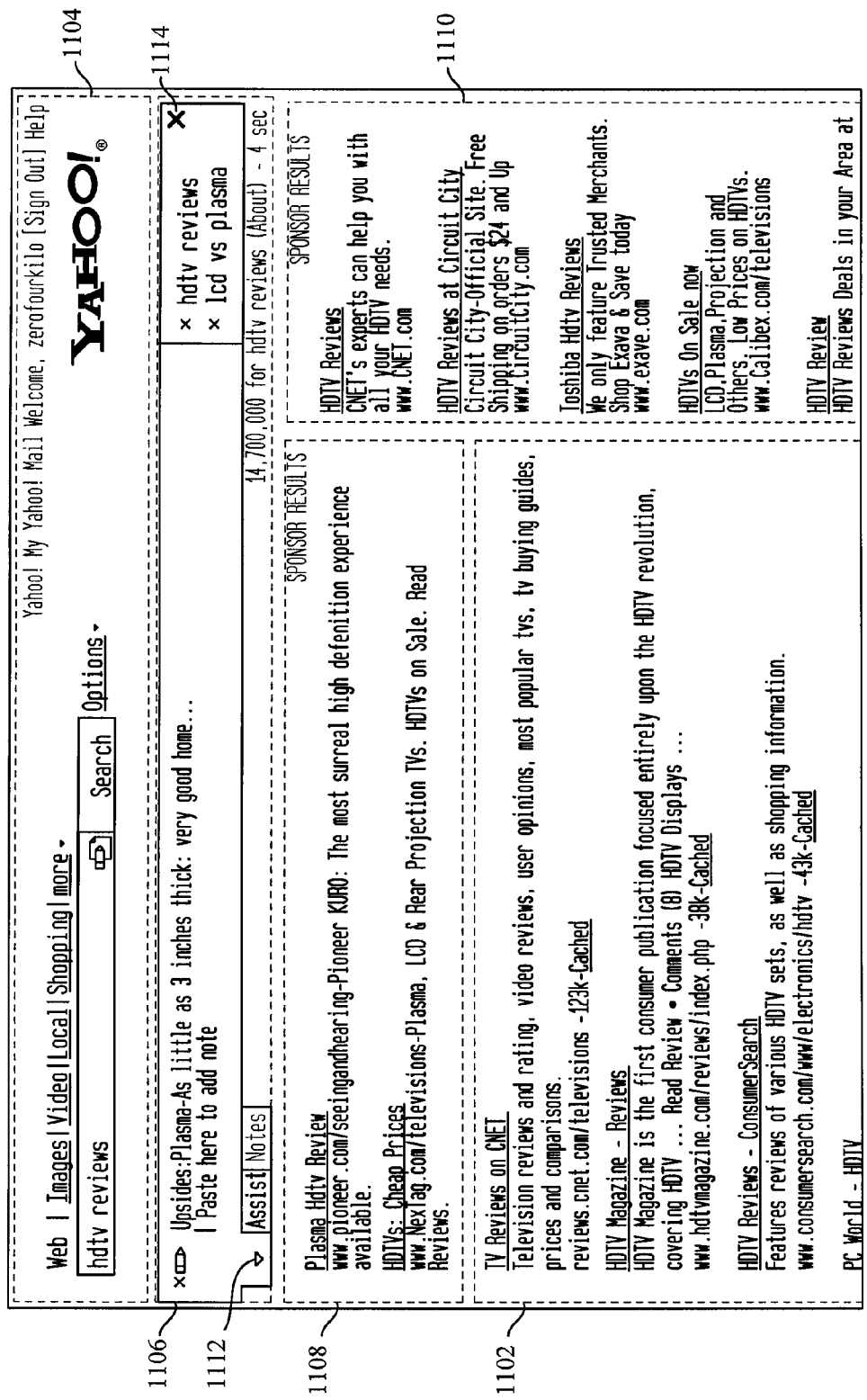
FIG. 11 is an illustration of another search results page that includes a means for accessing a research tool implemented as an on-page drop down window or panel in accordance with an embodiment of the present invention.

FIG. 11 depicts another search results page 1100 that includes a means for accessing a research tool implemented as an on-page drop down window or panel in accordance with an embodiment of the present invention. As shown in FIG. 11, search results page 1100 includes a search results section 1102, a header section 1104, a research tool access section 1106, and two sections 1108 and 1110 dedicated to sponsored search results. In search results page 1100, research tool access section 1106 comprises a condensed version of the research tool that appears in an on-page drop down window or panel below header section 1104. The condensed version of the research tool may appear in the on-page drop down window responsive to detection of a research session by research session detector 118. To access a complete or expanded version of the research tool, the user must activate an expansion element 1112 within research tool access section 1106. Research tool access section 1106 also includes a cancellation element 1114 (denoted with an "X") that allows a user to cease viewing the condensed version of the research tool. When activated by a user, cancellation element 1114 causes the window within research tool access section 1206 to be closed and causes any logged research session results to be discarded.

Figure 12:
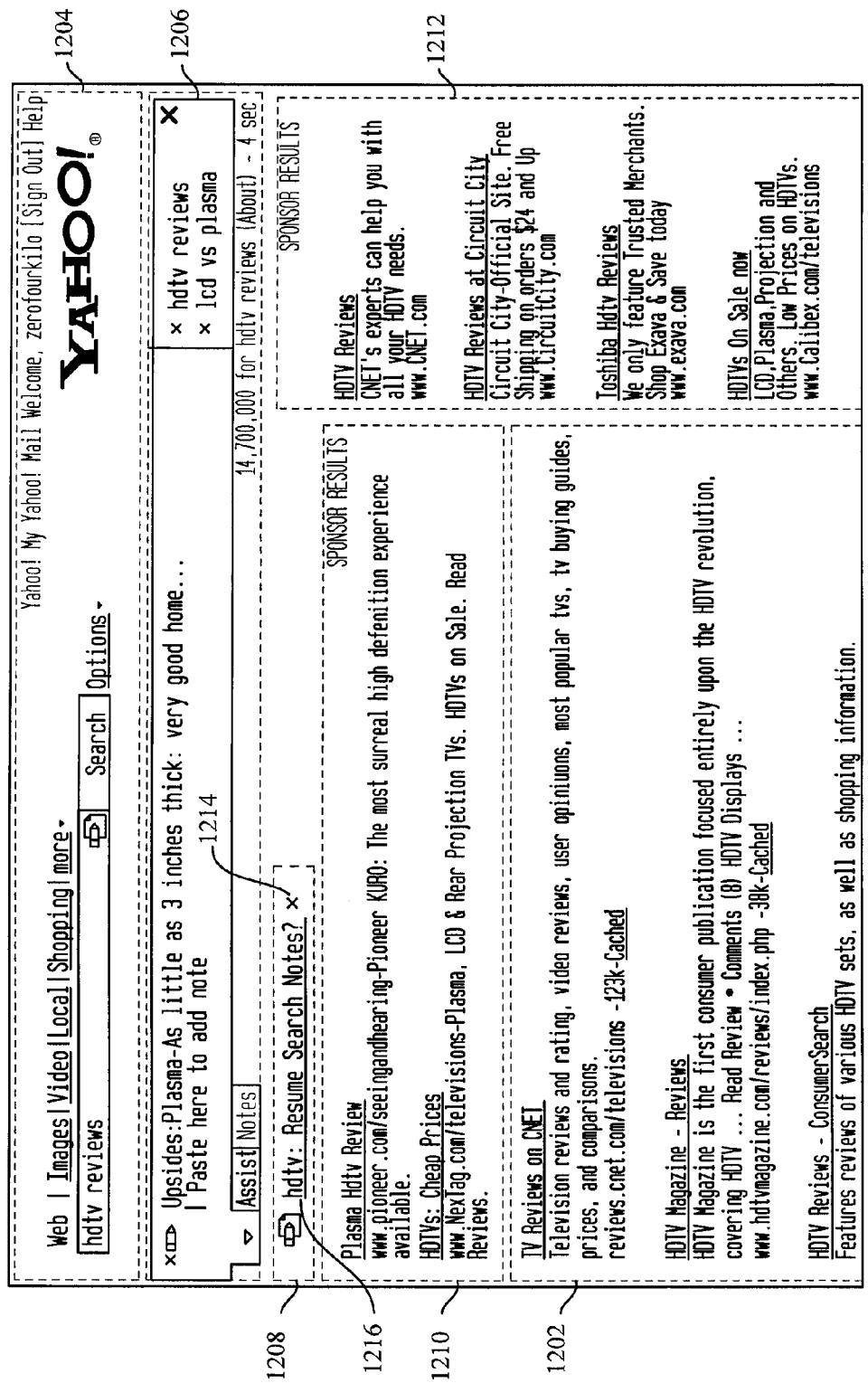
FIG. 12 is an illustration of yet another search results page that includes a means for accessing a research tool implemented as an on-page drop down window or panel in accordance with an embodiment of the present invention.

FIG. 12 depicts yet another search results page 1200 that includes a means for accessing a research tool implemented as an on-page drop down window or panel in accordance with an embodiment of the present invention. As shown in FIG. 12, search results page 1200 includes a search results section 1202, a header section 1204, a first research tool access section 1206, a second research tool access section 1208, and two sections 1210 and 1212 dedicated to sponsored search results. In search results page 1200, first research tool access section 1206 and section research tool access section 1208 may each be displayed responsive to detection of a research session by research session detector 118.

First research tool access section 1206 comprises a condensed version of the research tool (similar to research tool access section 1106) that appears in an on-page drop down window below header section 1204. Second research tool access section 1208 comprises a research tool activation link 1212. Research tool activation link 1212 is an interface element that, when activated by a user, causes an expanded version of the condensed research tool shown in first research tool access section 1206 to be displayed to the user. Research tool activation link 1212 advantageously comprises text that describes the topic of the research session that has been detected ("hdtv") as well as text that asks the user whether or not the user would like to resume taking notes about his/her research. The reference to resuming taking notes in research tool activation link 1212 indicates that the research session detected by research session detector 118 is an extension of a pre-existing research session associated with the user. Second research tool access section 1208 also includes a cancellation element 1214 (denoted with an "X") that allows a user to decline the invitation to resume the research session.

Figure 13A:
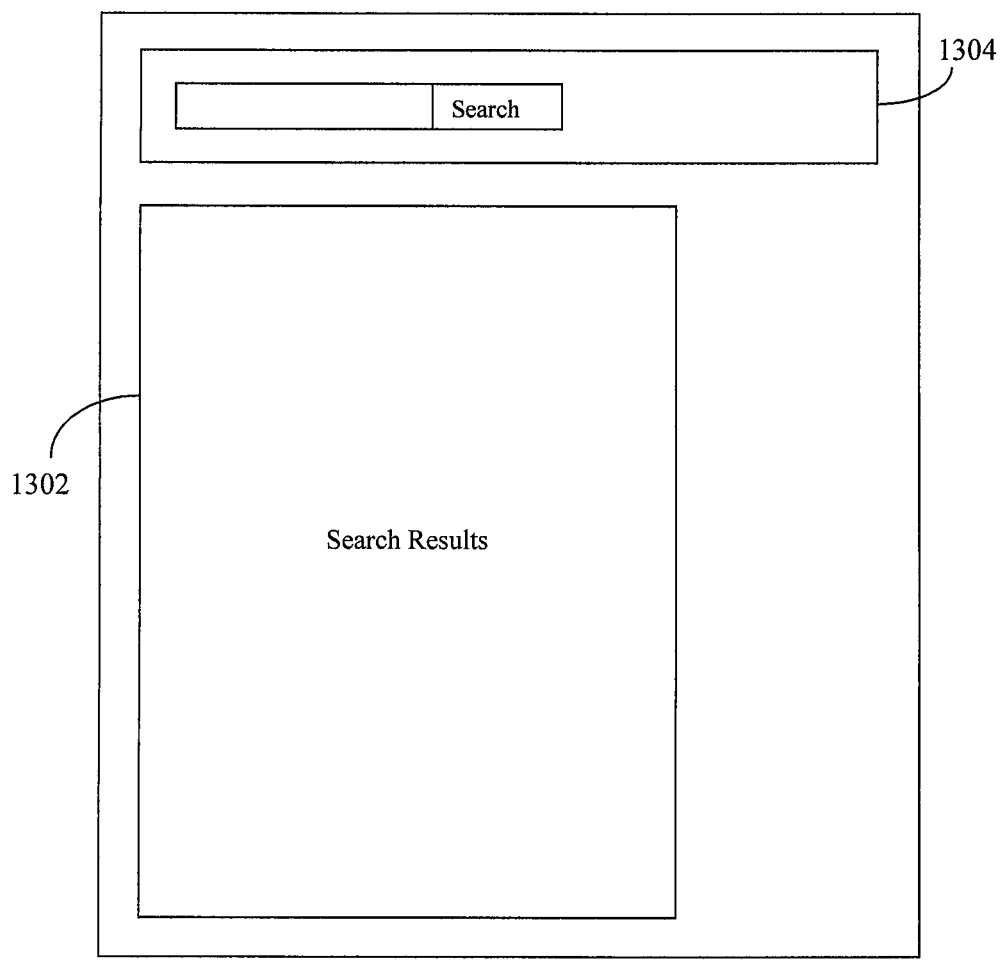
FIGS. 13A and 13B illustrate a search results page and a research tool preview element that is overlaid thereon responsive to the detection of a research session in accordance with an embodiment of the present invention.
Figure 13B:
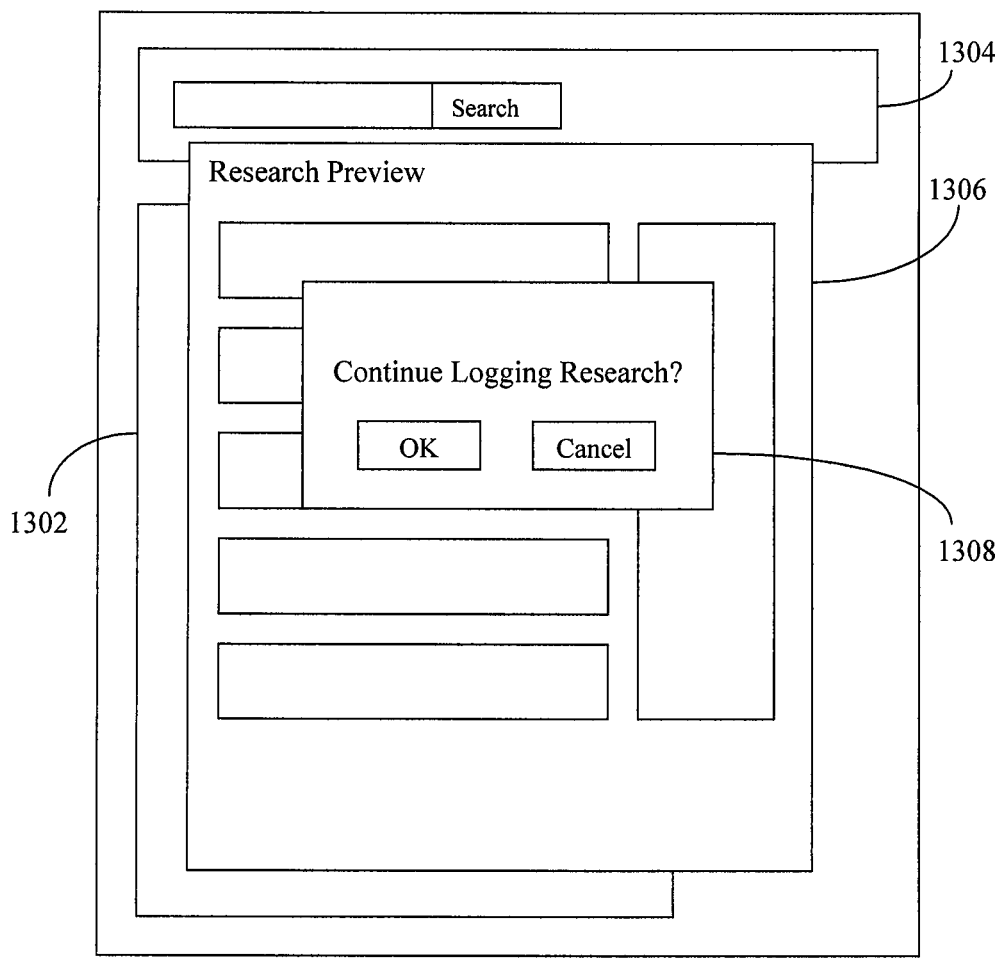

FIGS. 13A and 13B illustrate a search results page 1300 and a research tool preview element 1306 that is overlaid thereon responsive to the detection of a research session in accordance with an embodiment of the present invention. As shown in FIG. 13A, search results page 1300 includes a search results section 1302 and a header section 1304. As shown in FIG. 13B, responsive to the detection of a research session by research session detector 118, a research tool preview element 1306 is overlaid on search results page 1300. Research tool preview element 1306 provides a representation of what a research document that embodies the research tool would look like should a user choose to access it. As further shown in FIG. 13B, a decision box 1308 is also overlaid on search results page 1300. Decision box 1308 requires a user to either accept continued logging of research by clicking on "OK," which will cause the research document to be maintained, or to cancel the continued logging of research by clicking on "Cancel," in which case the research document will be discarded.

Figure 14:
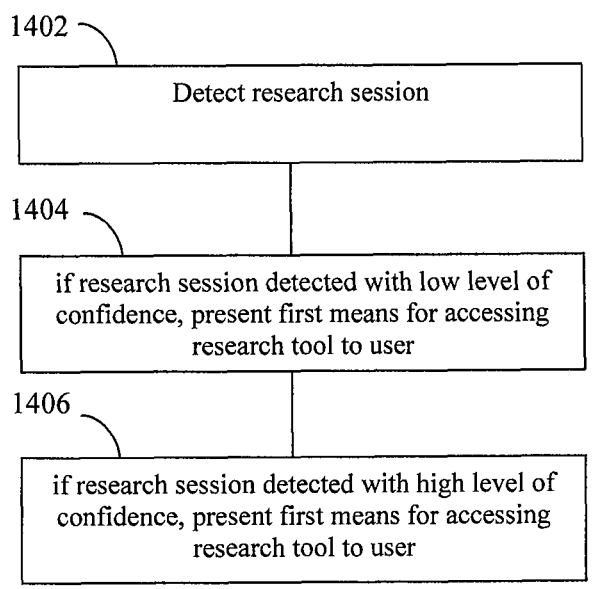
FIG. 14 depicts a flowchart of a method for selectively providing first or second means for accessing a research tool to a user in accordance with an embodiment of the present invention.

In certain embodiments of the present invention, different means for accessing a research tool may be presented to a user depending on a level of confidence associated with the detection of a research session. Thus, for example, if a research session is detected by research session detector 118 but at a relatively low confidence level, then a first means for accessing a research tool may be presented to the user. However, if a research session is detected by research session detector 118 but at a relatively high confidence level, then a second means for accessing the research tool may be presented to the user. The first means may comprise a less imposing or intrusive method of inviting the user to access the research tool as compared to the second means. In this way, the level of engagement of the user is matched to the level of certainty that the user will benefit from having access to the research tool. For example, in one embodiment, the first means may comprise the insertion of a simple invitation to use the research tool into the body of a search results page as shown in FIG. 9 or the appearance of a condensed version of the research tool in a drop down window within the search results page as shown in FIG. 11, while the second means may comprise the overlay of a research tool preview element over a search results page as shown in FIGS. 13A and 13B. Other variations of this approach may be used. A general description of this approach in flowchart form is shown in FIG. 14.

C. Example Computer System Implementations

Figure 15:
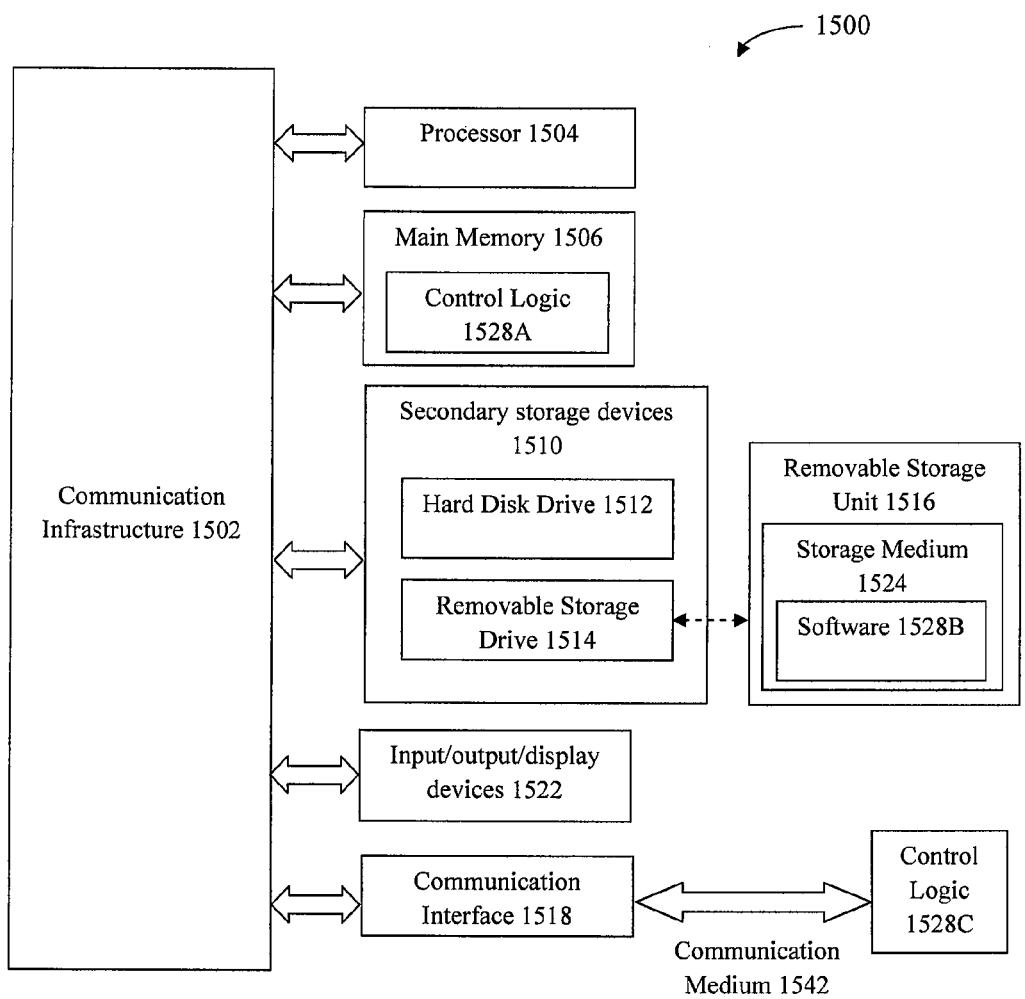
FIG. 15 is a block diagram of an example computer system in which embodiments of the present invention may be implemented.

The embodiments described herein, including systems, methods/processes, and/or apparatuses, may be implemented using well known servers/computers, such as computer 1500 shown in FIG. 15. For example, search engine 106 and research session manager 116 of FIG. 1 as well as the methods described in the flowcharts depicted in FIGS. 3, 5, 6 and 14 can be implemented using one or more computers 1500.

Computer 1500 can be any commercially available and well known computer capable of performing the functions described herein, such as computers available from International Business Machines, Apple, Sun, HP, Dell, Cray, etc. Computer 1500 may be any type of computer, including a desktop computer, a server, etc.

Computer 1500 includes one or more processors (also called central processing units, or CPUs), such as a processor 1504. Processor 1504 is connected to a communication infrastructure 1502, such as a communication bus. In some embodiments, processor 1504 can simultaneously operate multiple computing threads.

Computer 1500 also includes a primary or main memory 1506, such as random access memory (RAM). Main memory 1506 has stored therein control logic 1528A (computer software), and data.

Computer 1500 also includes one or more secondary storage devices 1510. Secondary storage devices 1510 include, for example, a hard disk drive 1512 and/or a removable storage device or drive 1514, as well as other types of storage devices, such as memory cards and memory sticks. For instance, computer 1500 may include an industry standard interface, such a universal serial bus (USB) interface for interfacing with devices such as a memory stick. Removable storage drive 1514 represents a floppy disk drive, a magnetic tape drive, a compact disk drive, an optical storage device, tape backup, etc.

Removable storage drive 1514 interacts with a removable storage unit 1516. Removable storage unit 1516 includes a computer useable or readable storage medium 1524 having stored therein computer software 1528B (control logic) and/ or data. Removable storage unit 1516 represents a floppy disk, magnetic tape, compact disk, DVD, optical storage disk, or any other computer data storage device. Removable storage drive 1514 reads from and/or writes to removable storage unit 1516 in a well known manner.

Computer 1500 also includes input/output/display devices 1522, such as monitors, keyboards, pointing devices, etc.

Computer 1500 further includes a communication or network interface 1518. Communication interface 1518 enables computer 1500 to communicate with remote systems and devices. For example, communication interface 1518 allows computer 1500 to communicate over communication networks or mediums 1542, such as LANs, WANs, the Internet, etc. Network interface 1518 may interface with remote sites or networks via wired or wireless connections.

Control logic 1528C may be transmitted to and from computer 1500 via the communication medium 1542. More particularly, computer 1200 may receive and transmit carrier waves (electromagnetic signals) modulated with control logic 1528C via communication medium 1542.

Any apparatus or manufacture comprising a computer useable or readable medium having control logic (software) stored therein is referred to herein as a computer program product or program storage device. This includes, but is not limited to, computer 1500, main memory 1506, secondary storage devices 1510, and removable storage unit 1516. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

D. Conclusion

While various embodiments of the present invention have been described above, it should be understood that they have been presented by way of example only, and not limitation. It will be apparent to persons skilled in the relevant art(s) that various changes in form and details may be made to the embodiments described above without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for automatically providing access to one or more research tools, comprising:
    obtaining information related to a series of queries submitted by a user of a search engine, wherein the obtained information comprises a query log and a browse history;
    based on the obtained information, determining if the user of the search engine is conducting research about a particular topic; and
    providing access to the user of the search engine to the one or more research tools responsive to determining that the user of the search engine is conducting the research about a particular topic based on a level of confidence associated with the determining of the user conducting the research about the particular topic, wherein
        providing access to the user of the search engine to the one or more research tools comprises selectively providing to the user either a first means for accessing the one or more research tools based on a first level of confidence or a second means for accessing the one or more research tools based on a second level of confidence,
        the first level of confidence is lower than the second level of confidence, and the one or more research tools enable the user to collect and organize documents retrieved by the search engine in response to the series of queries.

2. The method of claim 1, wherein obtaining information related to a series of queries submitted by a user of a search engine comprises obtaining one or more of:
    one or more query terms of each query in the series of queries;
    one or more underlying concepts shared among the series of queries;
    information relating to one or more documents identified by the search engine responsive to receiving the series of queries;
    a total amount of queries in the series of queries; or
    an amount of documents identified by the search engine responsive to receiving one or more queries in the series of queries that have been accessed by the user.

3. The method of claim 2, wherein the information relating to each of the one or more documents identified by the search engine responsive to receiving the series of queries comprises one or more of:
    a title of the document;
    a URL associated with the document;
    text of the document;
    an abstract of the document;
    one or more tags associated with the document; or
    metadata associated with the document.

4. The method of claim 1, wherein determining if the user of the search engine is conducting research about a particular topic comprises analyzing a length of an information retrieval session during which the series of queries was submitted.

5. The method of claim 1, wherein determining if the user of the search engine is conducting research about a particular topic comprises analyzing an amount of documents identified in response to one or more of the queries in the series of queries that have been accessed by the user.

6. The method of claim 1, wherein determining if the user of the search engine is conducting research about a particular topic comprises measuring a similarity between two or more queries in the series of queries.

7. The method of claim 1, wherein determining if the user of the search engine is conducting research about a particular topic comprises measuring a similarity between two or more documents identified by the search engine responsive to receiving the queries.

8. The method of claim 1, wherein determining if the user of the search engine is conducting research about a particular topic comprises determining if the user conducted research about the particular topic during a previous information retrieval session.

9. The method of claim 1, wherein providing access to the user of the search engine to the one or more research tools comprises inserting one or more user interface elements into a search results page provided to the user by the search engine.

10. The method of claim 1, wherein providing access to the user of the search engine to the one or more research tools comprises overlaying one or more windows onto a search results page provided to the user by the search engine.

11. A system comprising:
    at least one server that includes one or more processors;
    a search engine configured to receive a series of queries submitted by a user and to identify one or more documents responsive to each query in the series of queries; and a research session manager implemented at least partially by the one or more processors and connected to the search engine, the research session manager configured to;

obtain information related to the series of queries, wherein the obtained information comprises a query log and a browse history, determine if the user of the search engine is conducting research about a particular topic based on the obtained information, provide access to the user of the search engine to one or more research tools responsive to determining that the user of the search engine is conducting the research about a particular topic based on a level of confidence associated with the determining of the user conducting the research about the particular topic, wherein selectively provide to the user either a first means for accessing the one or more research tools based on a first level of confidence or a second means for accessing the one or more research tools based on a second level of confidence, the first level of confidence is lower than the second level of confidence, and the one or more research tools enable the user to collect and organize documents retrieved by the search engine in response to the series of queries.

12. The system of claim 11, wherein the research session manager is configured to obtain information related to the series of queries by obtaining one or more of:

one or more query terms of each query in the series of queries;

one or more underlying concepts shared among the series of queries;

information relating to one or more of the documents identified by the search engine responsive to receiving the series of queries;

a total amount of queries in the series of queries; or an amount of documents identified by the search engine responsive to receiving one or more queries in the series of queries that have been accessed by the user.

13. The system of claim 12, wherein the information relating to each of the one or more of the documents identified by the search engine responsive to receiving the series of queries comprises one or more of:

a title of the document;
a URL associated with the document;
text of the document;
an abstract of the document;
one or more tags associated with the document; or metadata associated with the document.

14. The system of claim 11, wherein the research session manager is configured to determine if the user of the search engine is conducting research about a particular topic by at least analyzing a length of an information retrieval session during which the series of queries was submitted.

15. The system of claim 11, wherein the research session manager is configured to determine if the user of the search engine is conducting research about a particular topic by at least analyzing an amount of documents identified in response to one or more of the queries in the series of queries that have been accessed by the user.

16. The system of claim 11, wherein the research session manager is configured to determine if the user of the search engine is conducting research about a particular topic by at least measuring a similarity between two or more queries in the series of queries.

17. The system of claim 11, wherein the research session manager is configured to determine if the user of the search engine is conducting research about a particular topic by at least measuring a similarity between two or more documents identified by the search engine responsive to receiving the queries.

18. The system of claim 11, wherein the research session manager is configured to determine if the user of the search engine is conducting research about a particular topic by at least determining if the user conducted research about the particular topic during a previous information retrieval session.

19. The system of claim 11, wherein the research session manager is configured to provide access to the user of the search engine to the one or more research tools by inserting one or more user interface elements into a search results page provided to the user by the search engine.

20. The system of claim 11, wherein the research session manager is configured to provide access to the user of the search engine to the one or more research tools by overlaying one or more windows onto a search results page provided to the user by the search engine.

21. A non-transitory machine-readable medium having information for automatically providing access to one or more research tools, wherein the information, when read by the machine, causes the machine to perform the following:

obtaining information related to a series of queries submitted by a user of a search engine, wherein the obtained information comprises a query log and a browse history;

determining if the user of the search engine is conducting research about a particular topic based on the obtained information; and providing access to the user of the search engine to the one or more research tools responsive to determining that the user of the search engine is conducting the research about a particular topic based on a level of confidence associated with the determining of the user conducting the research about the particular topic, wherein providing access to the user of the search engine to the one or more research tools comprises selectively providing to the user either a first means for accessing the one or more research tools based on a first level of confidence or a second means for accessing the one or more research tools based on a second level of confidence, the first level of confidence is lower than the second level of confidence, and the one or more research tools enable the user to collect and organize documents retrieved by the search engine in response to receiving the series of queries.

22. The medium of claim 21, wherein obtaining information related to a series of queries submitted by a user of a search engine comprises obtaining one or more of:

one or more query terms of each query in the series of queries;

one or more underlying concepts shared among the series of queries;

information relating to one or more documents identified by the search engine responsive to receiving the series of queries;

a total amount of queries in the series of queries; or an amount of documents identified by the search engine responsive to receiving one or more queries in the series of queries that have been accessed by the user.

23. The medium of claim 22, wherein the information relating to each of the one or more documents identified by the search engine responsive to receiving the series of queries comprises one or more of:
- a title of the document;
- a URL associated with the document;
- text of the document;
- an abstract of the document;
- one or more tags associated with the document; or metadata associated with the document.

24. The medium of claim 21, wherein determining if the user of the search engine is conducting research about a particular topic comprises analyzing a length of an information retrieval session during which the series of queries was submitted.

25. The medium of claim 21, wherein determining if the user of the search engine is conducting research about a particular topic comprises analyzing an amount of documents identified in response to one or more of the queries in the series of queries that have been accessed by the user.

26. The medium of claim 21, wherein determining if the user of the search engine is conducting research about a particular topic comprises measuring a similarity between two or more queries in the series of queries.

27. The medium of claim 21, wherein determining if the user of the search engine is conducting research about a particular topic comprises measuring a similarity between two or more documents identified by the search engine responsive to receiving the queries.

28. The medium of claim 21, wherein determining if the user of the search engine is conducting research about a particular topic comprises determining if the user conducted research about the particular topic during a previous information retrieval session.

29. The medium of claim 21, wherein providing access to the user of the search engine to the one or more research tools comprises inserting one or more user interface elements into a search results page provided to the user by the search engine.

30. The medium of claim 21, wherein providing access to the user of the search engine to the one or more research tools comprises overlaying one or more windows onto a search results page provided to the user by the search engine.

* * * * *